Oct. 23, 1951        J. C. MILLS        2,572,743
APPARATUS FOR USE IN THE TREATMENT OF ARTICLES
Filed Nov. 21, 1947        3 Sheets-Sheet 1
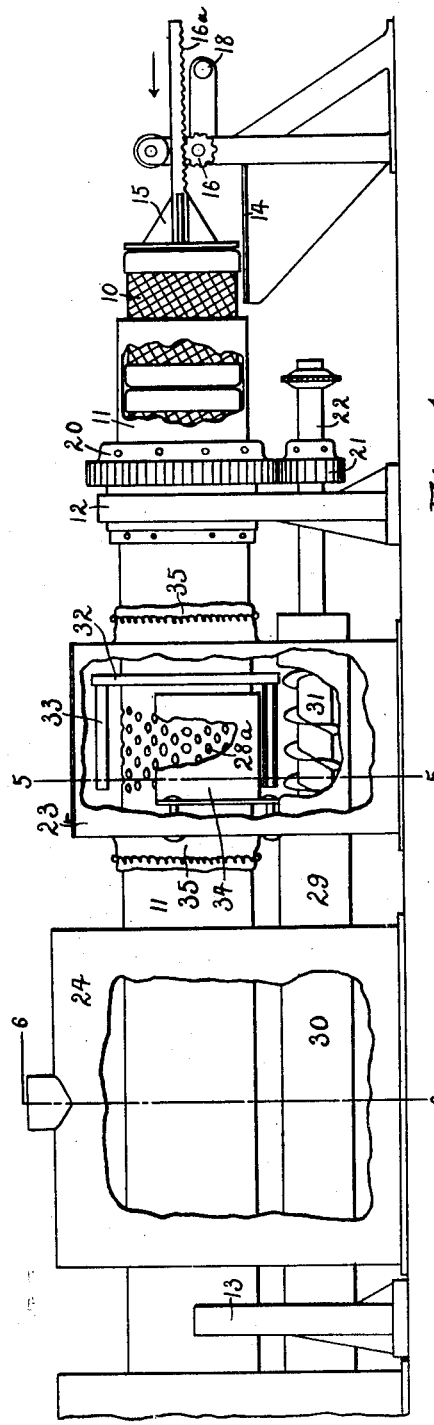
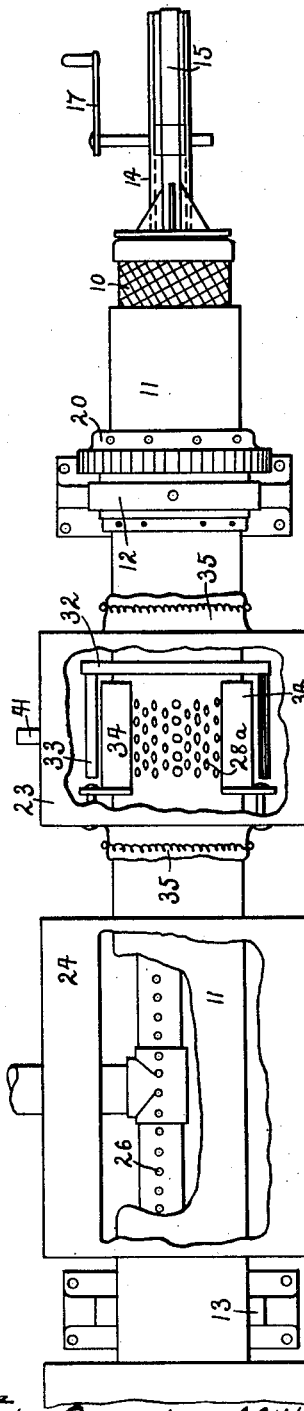
John Coniston Mills
Inventor
by Lester L. Sargent
Attorney Oct. 23, 1951 J. C. MILLS 2,572,743
APPARATUS FOR USE IN THE TREATMENT OF ARTICLES
Filed Nov. 21, 1947 3 Sheets-Sheet 2

John Coniston Mills
Inventor.
by Lester L. Sargent
Attorney

Oct. 23, 1951      J. C. MILLS      2,572,743

APPARATUS FOR USE IN THE TREATMENT OF ARTICLES

Filed Nov. 21, 1947      3 Sheets-Sheet 3

John Coniston Mills, Inventor
by Lester L. Sargent
Attorney

Patented Oct. 23, 1951

2,572,743

UNITED STATES PATENT OFFICE 2,572,743

APPARATUS FOR USE IN THE TREATMENT OF ARTICLES

John Coniston Mills, Wolverhampton, England

Application November 21, 1947, Serial No. 787,408
In Great Britain December 7, 1946

9 Claims. (Cl. 91—12.2)

The invention relates to a process, known as "cementation," and consisting in impregnating or coating metal articles with other metals or other substances either wholly or partially.

The method heretofore or usually adopted has been to pack the articles in individual containers along with a mixture consisting of sand or other inert powder mixed with a proportion of impregnating or coating material in powdered or granulated form, and to heat the container for a given time in a furnace, after which the container is opened and the articles and impregnating or coating mixture removed. Since the mixture has lost a large proportion of its impregnating or coating material and activity, it is usually discarded as no longer fit for use. This invention has for its object to provide a continuous process of cementation and one in which the mixture is used continuously.

According to this invention the articles and the impregnating or coating material are fed into one end of a relatively large diameter tube, means being provided for rotating the tube and traversing the articles therealong. The tube passes first through a mixture adding chamber hereinafter referred to, and passes from thence through a heating furnace. From the heating furnace the tube passes through a mixture-extraction chamber in which locality the tube has apertures through which the mixture can fall on to a conveyor, by which it is carried back to the said mixture-adding chamber. From the mixture-extraction chamber, the tube may pass through a cooling device, beyond which the tube is open for the delivery of the articles.

The mixture carried back, by the conveyor, to the mixture adding chamber is delivered to the top thereof, and falls on to the rotating tube, the latter being perforated at such locality to allow the mixture to enter. A fixed shield covers the under part of the tube to prevent the mixture falling out therefrom.

The conveyor may deliver the mixture directly to the top of the mixture-adding chamber, or it may deliver it to the bottom thereof from whence it is raised by revolving buckets.

Before the conveyor delivers the mixture to the mixture-adding chamber, the mixture may be passed through suitable apparatus for extracting foreign material or for rejuvenating purposes. The casing of the return conveyor may be heated to maintain the cementation mixture at its correct temperature.

The material in the rotating tube may be loose or packed in perforated or wire-mesh containers or jigs.

The whole plant may be inclined to the horizontal in a forward and downward direction to facilitate movement of material or in either direction for other purposes.

An embodiment of the invention is described with reference to the accompanying drawings, in which, Figure 1 is a view, in side elevation, of the first part of the plant which includes the entrance end.

Figures 3 and 4 are plan views respectively of the parts shown in Figures 1 and 2.

Figure 2:
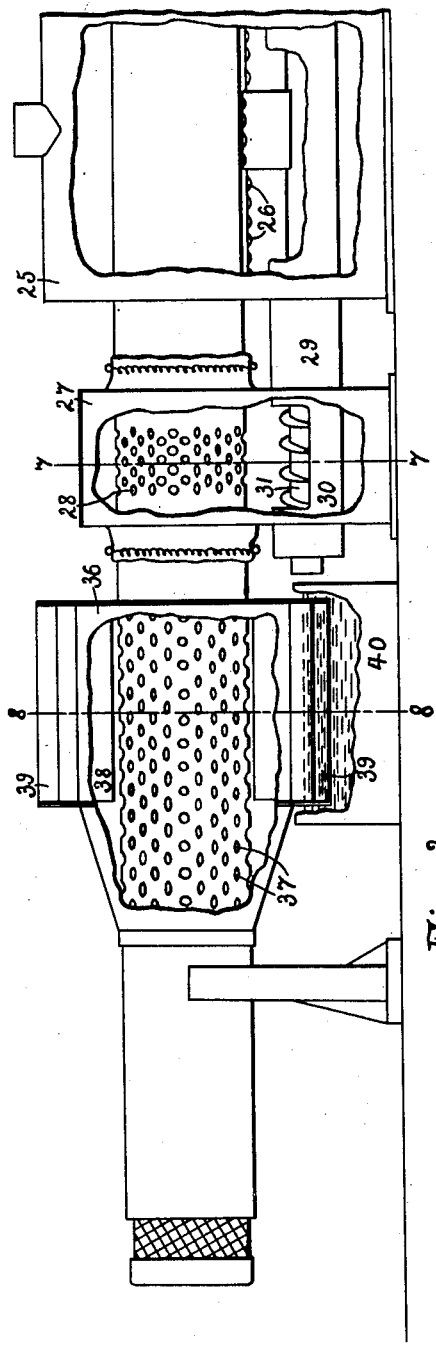
Figure 2 is a continuation of Figure 1 partly in section illustrating the rest of the plant including the discharge end.
Figure 4:
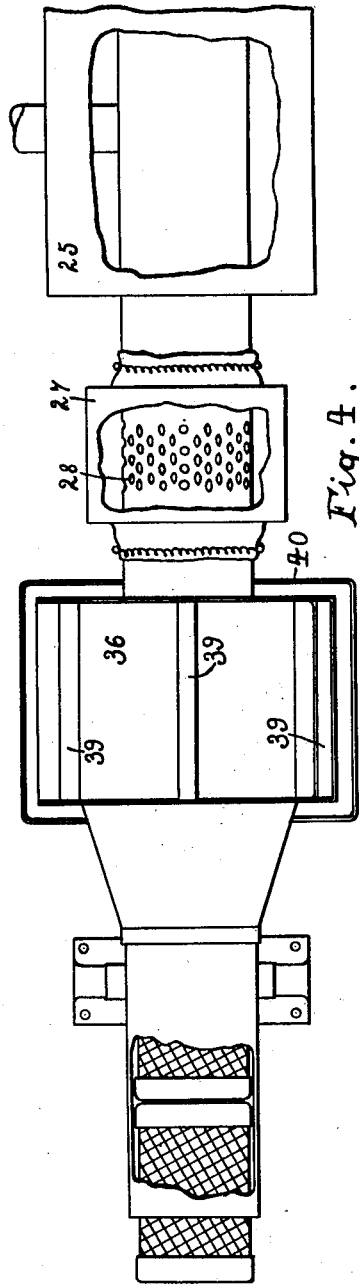
Figures 7, 8:
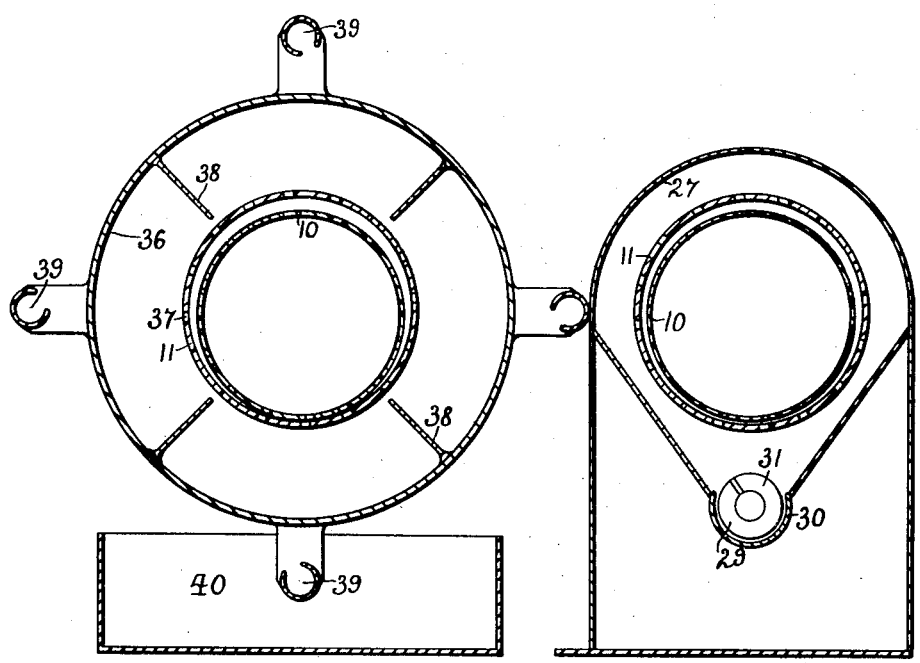
Figure 7 is a transverse section taken on the line 7, 7, of Figure 2.
Figure 8 is a transverse section taken on the line 8, 8, of Figure 2.

In these drawings, 10 indicates a series of wire baskets which are filled with the articles to be impregnated or coated together with sand or inert powder with which is mixed the required quantity of impregnating or coating material. 11 is a metal tube of relatively large diameter passing from end to end of the plant. It is mounted in a bearing 12 and is supported on steadies 13. The baskets 10 are fed in succession on to a table 14 and are pressed one-by-one into the tube 11 by the agency of a push bar 15 having a rack 16a engaged by a spur wheel 16 operated by a handle 17 or by a power shaft 18. By these means the baskets, with their contents, are caused to follow each other through the tube 11.

Secured on the tube 11 is a toothed ring 20 driven by a toothed pinion 21 secured on a power-driven shaft 22. Thus the tube 11 is continuously rotated, its speed being about six to twelve rotations per minute.

Figures 5, 6:
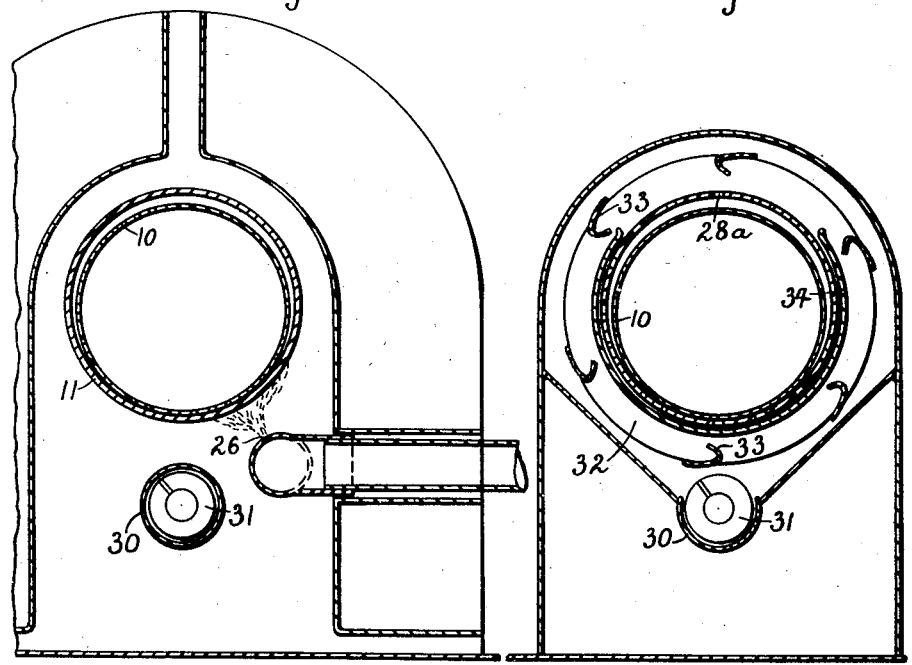
Figure 5 is a transverse section taken on the line 5, 5, of Figure 1.
Figure 6 is a transverse section taken on the line 6, 6, of Figure 1.

The tube 11 passes first through a mixture-adding chamber 23 hereinafter referred to. From thence it passes through two furnaces 24, 25, heated by gas burners 26, see Figure 6. From the furnace 25 the tube passes through a mixture-extraction chamber 27, the side of which is broken away to show the parts within. The part of the tube 11, which is located in the chamber 27 has perforations 28 through which the mixture falls, the perforations being too small to allow the impregnated or coated articles to fall through.

Passing longitudinally through the chamber 27 is a conveyor 29 comprising a tube 30 in which is turnably mounted a conveyor screw 31. The conveyor passes back through the furnaces 24, 25, and passes also through the bottom of the mixture-adding chamber 23. The end of the conveyor screw is coupled to the end of the power-driven shaft 22. The side of the chamber 23 is broken away in Figure 1 to show the parts within. A ring 32 is secured on the tube 11 and carries a set of longitudinally disposed buckets 33 which revolve with the tube and pick up mixture accumulated in the bottom of the chamber 23 (by the conveyor 29) and deliver it on to the tube 11. The latter has perforations 28a formed in the part thereof which is within the chamber 23, so that the mixture can fall back into the tube and into the baskets of articles proceeding therealong. The mixture is prevented from falling out of the tube 11 by a fixed shield 34 which passes under the tube and lies close up thereto.

Where the tube 11 passes through end walls of the chambers 23 and 27 sealing rings 35 are provided to prevent air entering the chambers and passing into the tube 11 through the apertures therein.

From the mixture extracting chamber 27, the tube 11 passes through a cylindrical cooling chamber 36 which is attached to the tube and rotates therewith. The part of the tube which is located in the chamber 36 has perforations 37 formed therein to allow sand contained in the chamber 36 to enter and fall out of the tube 11 and cool the articles passing therethrough. The sand is carried round within the chamber 36 by vanes 38 projecting inwardly from the chamber wall.

Attached to the outer surface of the cylindrical wall of the chamber 36 are longitudinally extending buckets or scoops 39 which gather water from a tank 40 and deliver it over the top of the chamber to cool it and the sand within.

The baskets 10 containing the articles to be impregnated or coated pass out from the end of the tube 11 and are collected by suitable means and the articles are then removed from the baskets.

The first few baskets contain enough sand or inert powder and impregnating or coating material properly to charge the tube 11; but as the process continues the mixture is fed back for recirculation but it will be deficient in impregnating or coating material, part of this having been taken up by the articles moving through the tube 11. Such deficiency is made up by adding to each subsequent basket the amount of impregnating or coating material required to impregnate or coat the articles.

The tube 11 and the chambers 23 and 27 are kept filled with inert gas, an inlet 41 for such purposes being shown on the chamber 23 in Figure 3.

The great advantage of the process is that the mixture does not have to be thrown away; but is used continuously.

Other advantages of the process and apparatus are: Reduction in the time cycle per unit weight of material; improvements in uniformity of cementation; greater compactness of plant, and reduction in man-hours per unit weight of material processed.

Having fully described my invention, what I claim and desire to secure by Letters Patent is:

1. Apparatus for use in treating metal articles with a powdered coating and impregnating mixture comprising a heating furnace, a mixture adding chamber, an excess mixture extracting chamber, a tube through which said articles and said mixture are passed, means for rotating said tube, said tube extending first through said mixture adding chamber then through said furnace and said excess mixture extracting chamber, openings of sufficient size to permit the passage of said mixture in the parts of said tube which are located in said mixture adding chamber and in said extracting chamber, and means for conveying excess mixture from said excess mixture extracting chamber to said mixture adding chamber.

2. Apparatus for use in treating metal articles with a powdered coating and impregnating mixture comprising a heating furnace, a mixture adding chamber, an excess mixture extracting chamber, a tube through which said articles and said mixture are passed, means for rotating said tube, said tube extending first through said mixture adding chamber then through said furnace and said excess mixture extracting chamber, openings of sufficient size to permit the passage of said mixture in the parts of said tube which are located in said mixture adding chamber and in said extracting chamber, means for conveying said excess mixture from said excess mixture extracting chamber to said mixture adding chamber, and a cooling chamber surrounding and attached to said tube for rotation therewith positioned beyond said mixture extracting chamber.

3. Apparatus for use in treating metal articles with a powdered coating and impregnating mixture comprising a heating furnace, a mixture adding chamber, an excess mixture extracting chamber, a tube through which said articles and said mixture are passed, means for rotating said tube, said tube extending first through said mixture adding chamber then through said furnace and said excess mixture extracting chamber, means for conveying excess mixture from said excess mixture extracting chamber to the bottom of said mixture adding chamber, openings of sufficient size to permit said mixture to pass in the part of said tube which passes through said excess mixture extracting chamber whereby said excess mixture can fall from said tube into said excess mixture extracting chamber, openings of a size to permit said mixture to pass in the part of said tube which passes through said mixture adding chamber, elevating means within said mixture adding chamber secured to the exterior of said tube and rotatable therewith for picking up accumulated material in the bottom of the mixture adding chamber and depositing said mixture on the top of the portion of the tube in said chamber, and a shield mounted in said mixture adding chamber under said tube and between said tube and said elevating means to prevent said mixture falling out through said openings.

4. Apparatus for use in treating metal articles with a powdered coating and impregnating mixture comprising a heating furnace, a mixture adding chamber, an excess mixture extracting chamber, a tube through which said articles and said mixture are passed, means for rotating said tube, said tube extending first through said mixture adding chamber then through said furnace and said excess mixture extracting chamber, means for conveying excess mixture from said excess mixture extracting chamber to said mixture adding chamber, openings of sufficient size to permit said mixture to pass in the parts of said tube which are located in said mixture adding chamber and in said extracting chamber, a cooling chamber located beyond said excess mixture extracting chamber and through which said tube passes, said cooling chamber comprising a cylindrical casing surrounding said tube and attached thereto for rotation therewith, openings of sufficient size to permit sand to pass in the part of the tube which passes through said casing, sand within said casing, and vanes attached to the inner surface of said casing for causing said sand to fall through said openings to cool the coated articles within said part of said tube.

5. Apparatus for use in the treatment of articles comprising a tube through which articles together with a powdered impregnating or coating mixture are continuously passed, means for rotating said tube, heating means for a portion of said tube, a mixture adding chamber about said tube anteriorly of said heating means, said tube having openings of sufficient size to permit the passage of said mixture in the part thereof located in said mixture adding chamber and through which openings said mixture can pass into said tube from said mixture adding chamber, an excess mixture extracting chamber about said tube posteriorly of said heating means, that portion of said tube located in said excess mixture extracting chamber having openings of sufficient size to permit the passage of said mixture through which excess mixture can pass from the interior of said tube into said excess mixture extracting chamber, elevating means within said mixture adding chamber secured to the exterior of said tube and rotatable therewith for picking up accumulated material in the bottom of the mixture adding chamber and depositing said mixture on the top of the portion of the tube in said chamber, means for conveying excess material from the bottom of said mixture extracting chamber to the bottom of said mixture adding chamber for re-use.

6. Apparatus for use in the treatment of articles comprising a tube through which articles together with a powdered impregnating or coating mixture are continuously passed, means for rotating said tube, heating means for a portion of said tube, a mixture adding chamber about said tube anteriorly of said heating means, said tube having openings of sufficient size for the passage of said mixture in the part thereof located in said mixture adding chamber and through which openings said mixture can pass into said tube from said mixture adding chamber, an excess mixture extracting chamber about said tube posteriorly of said heating means, that portion of said tube located in said excess mixture extracting chamber having openings of sufficient size to permit said mixture to pass through which excess mixture can pass from the interior of said tube into said excess mixture extracting chamber, elevating means within said mixture adding chamber secured to the exterior of said tube and rotatable therewith for picking up accumulated material in the bottom of mixture adding chamber and depositing said mixture in the top of the portion of the tube on said chamber, means for conveying excess material from the bottom of said mixture extracting chamber to the bottom of said mixture adding chamber for re-use, and a fixed shield mounted within said mixture adding chamber located below the tube and between the tube and said elevating means to prevent the mixture from passing through such openings out of the tube and into said mixture adding chamber.

7. Apparatus for use in the treatment of articles comprising a tube through which articles together with a powdered impregnating or coating mixture are continuously passed, means for rotating said tube, heating means for a portion of said tube, a mixture adding chamber about said tube anteriorly of said heating means, said tube having openings of a size to permit the passage of said mixture in the part thereof located in said mixture adding chamber and through which openings said mixture can pass into said tube from said mixture adding chamber, an excess mixture extracting chamber about said tube posteriorly of said heating means, that portion of said tube located in said excess mixture extracting chamber having openings of sufficient size to permit the passage of said mixture through which excess mixture can pass from the interior of said tube into said excess mixture extracting chamber, elevating means within said mixture adding chamber secured to the exterior of said tube and rotatable therewith for picking up accumulated material in the bottom of the mixture adding chamber and depositing said mixture on the top of the portion of the tube in said chamber, means for conveying excess material from the bottom of said mixture extracting chamber to the bottom of said mixture adding chamber for re-use, a fixed shield mounted within said mixture adding chamber located below the said tube and between said tube and said elevating means to prevent the mixture from passing through such openings out of the tube and back into said mixture adding chamber, and a cooling chamber about said tube posteriorly of said excess mixture extracting chamber mounted on said tube for rotation therewith, that portion of the tube located in said cooling chamber being provided with openings of a size to permit the passage of fine particles through which fine particles can enter and leave the tube and come in contact with the articles being treated to cool them.

8. Apparatus for use in the treatment of articles comprising a tube through which articles together with a powdered impregnating or coating mixture are continuously passed, means for rotating said tube, heating means for a portion of said tube, a mixture adding chamber about said tube anteriorly of said heating means, said tube having openings of a size to permit the passage of said mixture in the part thereof located in said mixture adding chamber and through which openings said mixture can pass into said tube from said mixture adding chamber, an excess mixture extracting chamber about said tube posteriorly of said heating means, that portion of said tube located in said mixture extracting chamber having openings of a size to permit the passage of said mixture through which excess mixture can pass from the interior of said tube into said excess mixture extracting chamber, elevating means with said mixture adding chamber secured to the exterior of said tube and rotatable therewith for picking up accumulated material in the bottom of the mixture adding chamber and depositing said mixture on the top of the portion of the tube in said chamber, means for conveying excess material from the bottom of said mixture extract chamber to the bottom of said mixture adding chamber for re-use, a fixed shield mounted within said mixture adding chamber located below the said tube and between said tube and said elevating means to prevent the mixture from passing through such openings out of the tube and into said mixture adding chamber, a rotary cooling chamber about said tube posteriorly of said excess mixture extracting chamber mounted on said tube for rotation therewith, that portion of the tube located in said cooling chamber being provided with openings of a size to permit the passage of fine particles through which fine particles can enter and leave the tube and come in contact with the articles being treated to cool them, and vanes attached to the inner wall of the cooling chamber to elevate such fine particles to permit them to fall through such openings.

9. Apparatus for use in the treatment of articles comprising a tube through which articles together with a powdered impregnating or coating mixture are continuously passed, means for rotating said tube, heating means for a portion of said tube, a mixture adding chamber about said tube anteriorly of said heating means, said tube having openings of sufficient size for the passage of said mixture in the part thereof located in said mixture adding chamber and through which openings said mixture can pass into said tube from said mixture adding chamber, an excess mixture extracting chamber about said tube posteriorly of said heating means, that portion of said tube located in said excess mixture extracting chamber having openings of sufficient size for the passage of said mixture through which excess mixture can pass from the interior of said tube into said excess mixture extracting chamber, elevating means within said mixture adding chamber secured to the exterior of said tube and rotatable therewith for picking up accumulated material in the bottom of the mixture adding chamber and depositing said mixture in the top of the portion of said tube in said chamber, means for conveying excess material from the bottom of said mixture extracting chamber to the bottom of said mixture adding chamber for re-use, a fixed shield mounted within said mixture adding chamber located below the said tube and between said tube and said elevating means to prevent the mixture from passing through such openings out of the tube and into said mixture adding chamber, a cooling chamber about said tube posteriorly of said excess mixture extracting chamber mounted on said tube for rotation therewith, that portion of the tube located in said cooling chamber being provided with openings of a size for the passage of fine material through which fine particles can enter and leave the tube and come in contact with the articles being treated to cool them, vanes attached to the inner wall of the cooling chamber to elevate such fine particles to permit them to fall through such openings and cooling means comprising conduits positioned adjacent the outer surface of said casing and adapted to direct cooling water on the outer surface of said casing.

JOHN C. MILLS.

REFERENCES CITED

The following references are of record in the file of this patent:

UNITED STATES PATENTS

| Number | Name | Date |
| --- | --- | --- |
| 660,579 | Leonard | Oct. 30, 1900 |
| 987,554 | Coggeshall | Mar. 21, 1911 |
| 1,091,057 | Gilson | Mar. 24, 1914 |
| 1,214,809 | Malm | Feb. 6, 1917 |
| 1,481,430 | Overbury | Jan. 22, 1924 |
| 1,769,412 | Bernhard | July 1, 1930 |
| 1,793,408 | Kronstad | Feb. 17, 1931 |
| 1,853,369 | Marshall | Apr. 12, 1932 |